United States Patent
Ravella et al.

(10) Patent No.: US 11,919,514 B1
(45) Date of Patent: Mar. 5, 2024

(54) SAFETY FILTER WITH PREVIEW DATA TO IMPROVE THE SAFETY OF STEER COMMANDS

(71) Applicant: PlusAI, Inc., Santa Clara, CA (US)

(72) Inventors: Siva Bhargav Ravella, San Jose, CA (US); Muhammad Waqas, Los Angeles, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/106,059

(22) Filed: Feb. 6, 2023

(51) Int. Cl.
   *B60W 30/12* (2020.01)
   *B60W 10/20* (2006.01)
   *B60W 60/00* (2020.01)

(52) U.S. Cl.
   CPC ............ *B60W 30/12* (2013.01); *B60W 10/20* (2013.01); *B60W 60/001* (2020.02); *B60W 2554/4041* (2020.02)

(58) Field of Classification Search
   CPC .... B60W 30/12; B60W 10/20; B60W 60/001; B60W 2554/4041
   See application file for complete search history.

(56) References Cited

U.S. PATENT DOCUMENTS

| | | | |
|---|---|---|---|
| 2013/0253767 A1* | 9/2013 | Lee | B60W 50/04 701/41 |
| 2014/0371992 A1* | 12/2014 | Di Cairano | B62D 5/0463 701/41 |
| 2016/0152236 A1* | 6/2016 | Yi | B60W 30/02 701/36 |
| 2017/0233001 A1* | 8/2017 | Moshchuk | G05D 1/021 701/42 |
| 2020/0189591 A1* | 6/2020 | Mellinger, III | B62D 6/003 |
| 2021/0316758 A1* | 10/2021 | Oboril | B60W 10/04 |
| 2021/0331663 A1* | 10/2021 | Newton | B60W 10/18 |
| 2022/0126876 A1* | 4/2022 | Tebbens | B60W 30/18163 |
| 2022/0219691 A1* | 7/2022 | Maleki | G06F 11/079 |
| 2023/0094169 A1* | 3/2023 | Kim | B60W 60/0011 701/25 |

* cited by examiner

*Primary Examiner* — Abby Y Lin
*Assistant Examiner* — Dylan M Katz
(74) *Attorney, Agent, or Firm* — Sheppard Mullin Richter & Hampton LLP (57) ABSTRACT

Methods, systems, and non-transitory computer readable media are configured to perform operations comprising obtaining, by a computing system, a lane-keeping safe set associated with constraints on lateral movement of a vehicle traveling on a road, generating, by the computing system, a lane-keeping safe set with preview based on the lane-keeping safe set and preview data, the preview data associated with characteristics of the road ahead of the vehicle, receiving, by the computing system, a steer command to control the lateral movement of the vehicle, and generating, by the computing system, a safe steer command by modifying the steer command based on the lane-keeping safe set with preview.

20 Claims, 6 Drawing Sheets

SAFETY FILTER WITH PREVIEW DATA TO IMPROVE THE SAFETY OF STEER COMMANDS

FIELD OF THE INVENTION

The present technology relates to autonomous systems. More particularly, the present technology relates to machine learning models that may be used in vehicle autonomous systems.

BACKGROUND

An autonomous system for navigation of a vehicle can plan and control motion for the vehicle. The planning and control functions of the autonomous system rely on data about the vehicle and an environment in which the vehicle is traveling, including the position and movement of other vehicles and objects. The performance of the planning and control functions can depend on such data as the state of the vehicle and the conditions of the environment change. Control of the vehicle can be subject to various safety considerations.

SUMMARY

Various embodiments of the present technology can include methods, systems, and non-transitory computer readable media configured to perform operations comprising obtaining, by a computing system, a lane-keeping safe set associated with constraints on lateral movement of a vehicle traveling on a road, generating, by the computing system, a lane-keeping safe set with preview based on the lane-keeping safe set and preview data, the preview data associated with characteristics of the road ahead of the vehicle, receiving, by the computing system, a steer command to control the lateral movement of the vehicle, and generating, by the computing system, a safe steer command by modifying the steer command based on the lane-keeping safe set with preview.

Some embodiments comprise generating, by the computing system, the preview data based on known characteristics of the road ahead of the vehicle.

Some embodiments comprise obtaining, by the computing system, the known characteristics of the road ahead of the vehicle from at least one of: an inertial monitoring unit (IMU) onboard the vehicle; an electronic map of the road ahead of the vehicle; a current position of the vehicle; and a current heading of the vehicle.

In some embodiments, the preview data comprises at least one of: positions of lane boundaries of the road ahead of the vehicle; positions of a planned path of the vehicle; and road bank information of the road ahead of the vehicle.

In some embodiments, obtaining the lane-keeping safe set comprises: selecting the lane-keeping safe set from a library comprising a plurality of the lane-keeping safe sets based on at least one of: a current operational design domain (ODD) of the vehicle; and an identity of the vehicle.

Some embodiments comprise generating, by the computing system, the lane-keeping safe set.

In some embodiments, the lane-keeping safe set is generated based on at least one of: a position of the vehicle; a velocity of the vehicle; an acceleration of the vehicle; a lateral wind speed at the vehicle; a lateral wind direction at the vehicle; and dynamics of an actuator of the vehicle.

In some embodiments, the lane-keeping safe set is generated based on dynamics of an actuator of the vehicle, and wherein the dynamics of the actuator of the vehicle comprise a delay of the actuator.

In some embodiments, the lane-keeping safe set comprises at least one of: a maximum allowed lateral offset from a planned path of the vehicle; a minimum allowed lateral offset from the planned path of the vehicle; a maximum allowed deviation from a heading of the vehicle; a maximum allowed lateral acceleration of the vehicle; a minimum allowed deviation from a sample optimal yaw path of the vehicle; a minimum allowed rate of deviation from a path of the vehicle; and a minimum allowed wobble of the vehicle.

In some embodiments, the lane-keeping safe set comprises safety constraints, and wherein the safety constraints are formulated as a control barrier function (CBF).

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

An autonomous system for navigation of a vehicle can plan and control motion for the vehicle. The planning and control functions of the autonomous system rely on data about the vehicle and an environment in which the vehicle is traveling, including the position and movement of other vehicles and objects. The performance of the planning and control functions can depend on such data as the state of the vehicle and the conditions of the environment.

Understanding an environment in which a vehicle having an autonomous system of navigation (e.g., ego vehicle) is traveling is fundamental to planning and controlling functions of the vehicle. The understanding of the environment can involve identifying objects such as other vehicles, pedestrians, traffic signals, etc. The understanding of the environment can also involve determining a drivable area (e.g., road surface) of the environment and various boundaries (e.g., lane boundaries, road curbs, road shoulders). For example, a truck traveling in a lane of a road can stay safely within that lane based on an understanding of the environment.

In vehicles having conventional autonomous systems, lateral movement of the vehicle, that is, movement to the left and right, is controlled by a primary controller. The primary controller issues steer commands to a steering actuator, which controls the direction of the vehicle according to the steer commands. Proper lateral lane keeping is of course critical to maintain safety. Undesired violations of a lane boundary could result in a collision or other unsafe event. However, under many conventional approaches, the primary controller does not consider lane boundaries when generating steer commands. Instead, the primary controller employs a reference path within the lane. As such, conventional solutions may issue a steer command that results in undesired violation of a lane boundary, thus implicating significant safety concerns.

Some conventional approaches involve designing a safety net for machine learning or neural network policy. However, none of the existing safety nets optimally formulate the problem as a barrier function to optimize for both safety and strict performance. Furthermore, many conventional approaches do not consider the additional information available from sources such as inertial monitoring units (IMU) and electronic maps.

In prior approaches, barrier functions are used for certain applications, but not for lateral control of a vehicle with variable boundary distance constraints. Also, conventional approaches do not consider factors such as steering actuator dynamics, sensor and system offsets and calibrations, additional modeling considering the information available from the IMU, and the breadth of novel scenarios involving these constraints.

The present technology provides improved approaches for improving the safety of steering commands issued by a primary controller of a vehicle. In various embodiments, the present technology includes a safety filter that can modify a steer command issued by a primary controller of a vehicle to create a safe steer command. The safe steer command can be sent to a steering actuator to control the direction of the vehicle.

The safety filter may modify the steer command according to a safe set for lane keeping with preview. The lane-keeping safe set with preview may be generated from a lane-keeping safe set and preview data. The preview data may include positions of lane boundaries of the road ahead of the vehicle, positions of a planned path of the vehicle, road bank information of the road ahead of the vehicle, and similar data.

The lane-keeping safe set may be selected from a library of lane-keeping safe sets. The selection may be based on a current operational design domain (ODD) of the vehicle. Each ODD describes specific operating conditions in which the vehicle may operate, such as weather conditions, infrastructure, location, time of day, type of street (e.g., freeway, surface street, parking lot), and similar conditions. The selection may be based on the design or configuration of the vehicle.

Lane-keeping safe sets and lane-keeping safe sets with preview may be generated and updated as often as desired. For example, lane-keeping safe sets and lane-keeping safe sets with preview can be generated to reflect rapidly changing sensor data, road conditions, and the like. The lane-keeping safe sets and lane-keeping safe sets with preview may be stored in a library for later retrieval. The lane-keeping safe sets, lane-keeping safe sets with preview, and safety filter may be implemented using one or more machine learning models.

Thus, the present technology provides improved approaches for improving the safety of steering commands issued by a primary controller of a vehicle. These and other inventive features and related advantages of the various embodiments of the present technology are discussed in more detail herein.

Figure 1:
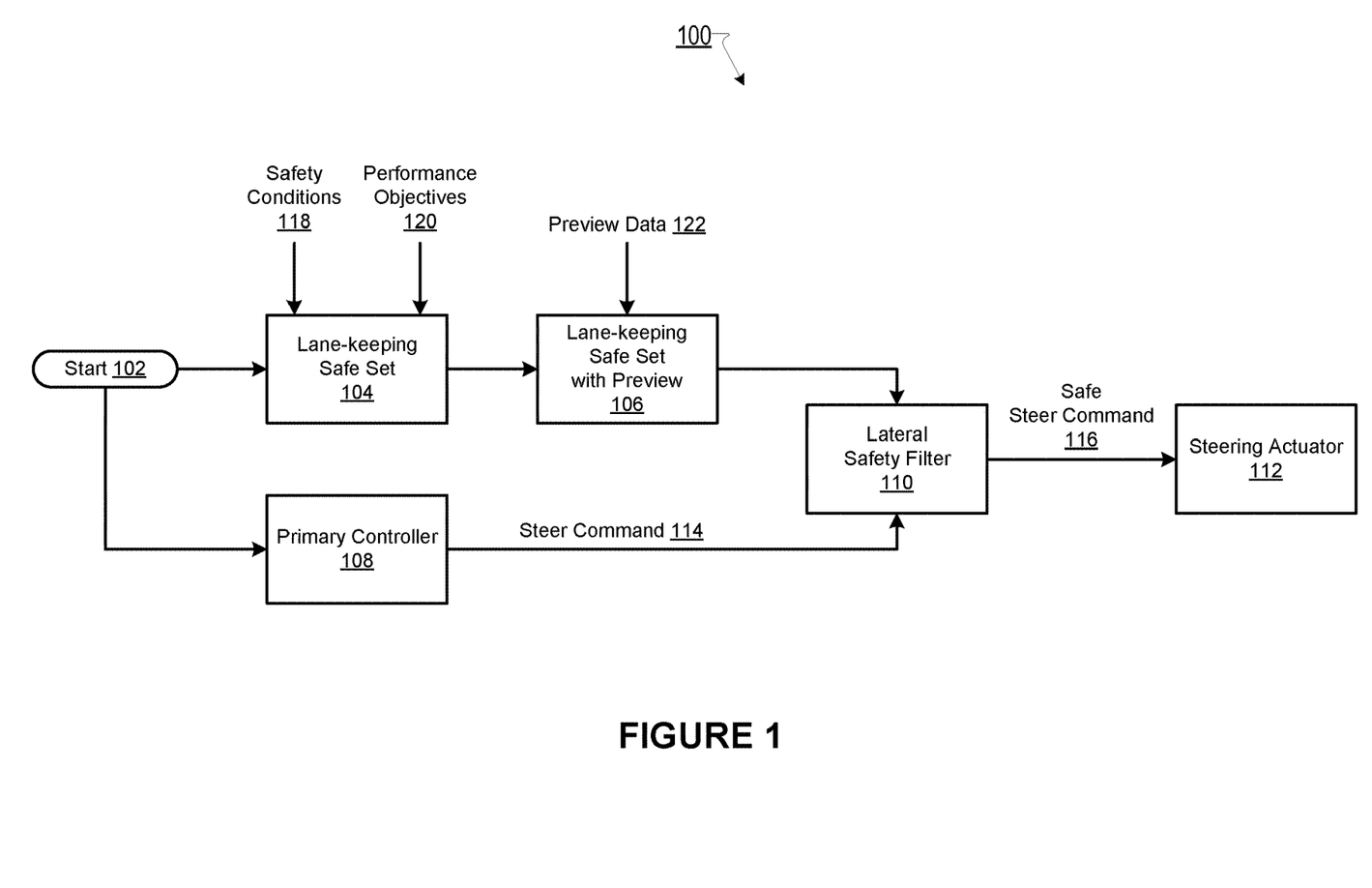
FIG. 1 illustrates an example simplified functional block diagram of a system for applying a safety filter with preview data to steer commands issued by a primary controller of a vehicle, according to some embodiments of the present technology.

FIG. 1 illustrates an example simplified functional block diagram of a system 100 for applying a safety filter with preview data to steer commands issued by a primary controller of a vehicle according to some embodiments of the present technology. The system 100 may include a lane-keeping safe set 104, a lane-keeping safe set with preview 106, a primary controller 108, a lateral safety filter 110, and a steering actuator 112. The system 100 can support or be implemented as part of a control function of an autonomous system of a vehicle, such as a control module 518 of an autonomous system 510 of FIG. 5, as discussed in more detail below.

The primary controller 108 may be implemented using any primary controller capable of issuing steer commands. The primary controller 108 may be implemented using conventional primary controllers, either modified or unmodified. For example, the primary controller 108 may be implemented as a Linear Quadratic Regulator (LQR) or a Pure Pursuit controller. The steering actuator 112 may be implemented as any steering actuator capable of steering a vehicle according to steer commands issued by the primary controller 108.

The lane-keeping safety set 104 may be associated with constraints on movement of a vehicle. For example, the lane-keeping safety set 104 may comprise safety constraints on lateral movement of a vehicle traveling on a road. The safety constraints may be based on safety conditions 118. The safety constraints may be formulated as a control barrier function (CBF). The lane-keeping safety set 104 may be generated and/or updated according to safety conditions 118, and performance objectives 120, and similar information.

The safety conditions 118 and/or safety constraints may include a maximum allowed lateral offset from a planned path of the vehicle, a maximum allowed lateral acceleration of the vehicle, a maximum allowed deviation from a heading of the vehicle, and similar conditions and constraints.

The lane-keeping safety set 104 may comprise the performance objectives 120 for lateral movement of a vehicle traveling on a road. The performance objectives 120 may include a minimum allowed lateral offset from the planned path of the vehicle, a minimum allowed deviation from a sample optimal yaw path of the vehicle, a minimum allowed rate of deviation from a path of the vehicle, a minimum allowed wobble of the vehicle, and similar performance objectives.

The lane-keeping safety set with preview 106 may be generated and/or updated according to the lane-keeping safety set 104 and preview data 122. The preview data 122 may be associated with characteristics of the road ahead of the vehicle. For example, the preview data may be based on known characteristics of the road ahead of the vehicle. The known characteristics of the road ahead of the vehicle may be obtained from an inertial monitoring unit (IMU) onboard the vehicle, an electronic map of the road ahead of the vehicle, a current position of the vehicle, a current heading of the vehicle, and similar sources and information.

A process of the system 100 may begin at start 102. The lane-keeping safety set 104 may be generated and/or updated according to the safety conditions 118 and the performance objectives 120. The lane-keeping safety set with preview 106 may be generated and/or updated according to the lane-keeping safety set 104 and the preview data 122.

The primary controller may issue a steer command 114. The steer command 114 may be unsafe. That is, the steer command 114 may cause the vehicle to violate a lane boundary. Such a violation could result in a collision between the vehicle and another obstacle, or another event compromising safety.

The lateral safety filter 110 can apply the lane-keeping safe set with preview 106 to the steer command 114, thereby producing a safe steer command 116. The safe steer command 116 can be provided to the steering actuator 112. The steering actuator 112 can control the lateral movement of the vehicle according to the safe steer command 116.

In some embodiments, some or all of the functionality performed by the system 100 may be performed by one or more computing systems implemented in a vehicle. In some embodiments, some or all of the functionality performed by the system 100 may be performed by one or more backend computing systems (e.g., remote from a vehicle). In some embodiments, some or all of the functionality performed by the system 100 may be performed by one or more computing systems associated with (e.g., carried by) one or more users riding in a vehicle. In some embodiments, some or all data processed and/or stored by the system 100 can be stored in a data store (e.g., local to the system 100) or other storage system (e.g., cloud storage remote from the system 100). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the system 100 can be implemented in any suitable combinations. Functionalities of the system 100 or variations thereof may be further discussed herein or shown in other figures.

As referenced or suggested herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the SAE standard, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

Figure 2:
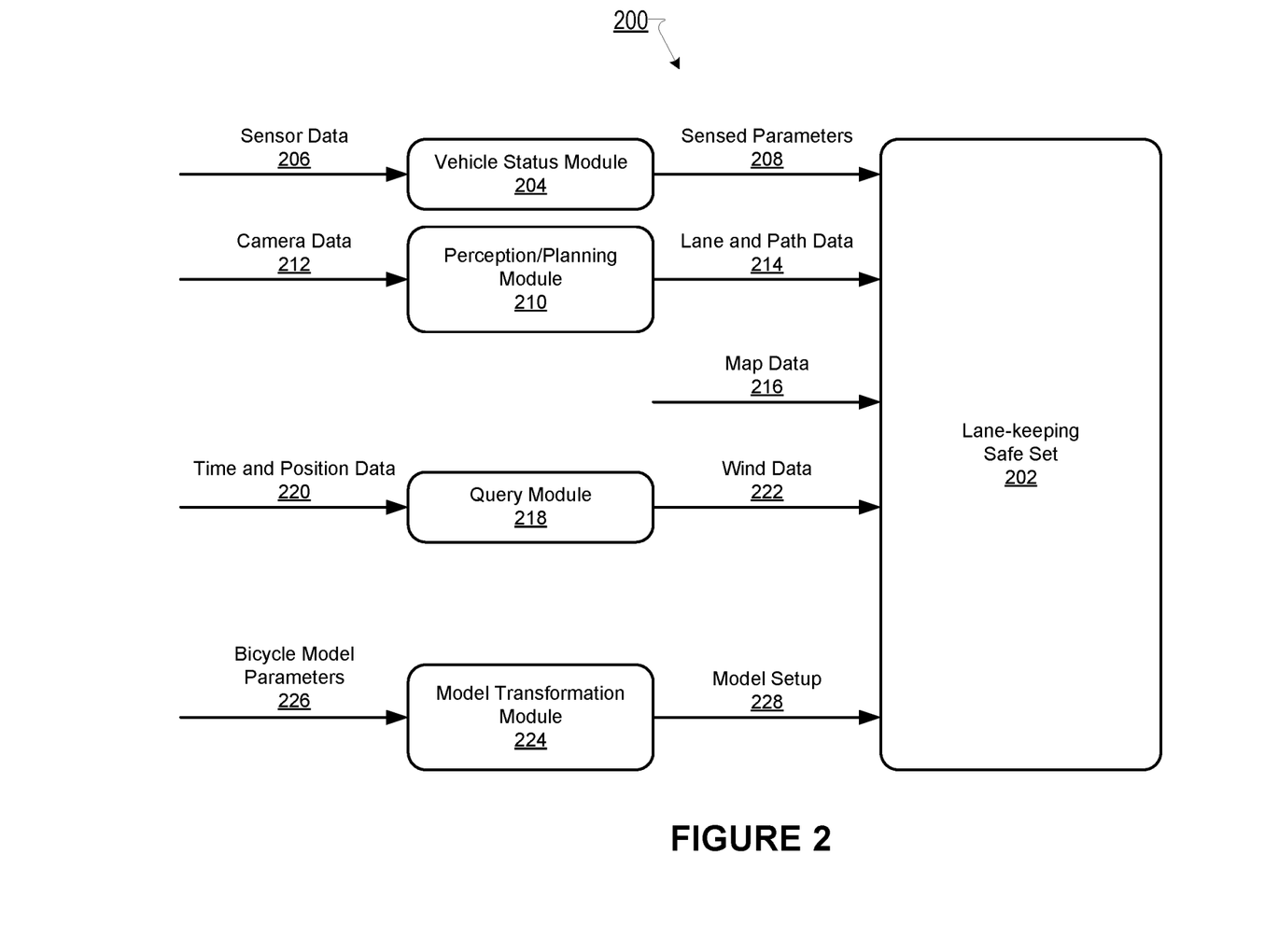
FIG. 2 illustrates an example block diagram associated with inputs to a lane-keeping safe set, according to some embodiments of the present technology.

FIG. 2 illustrates an example block diagram 200 associated with the inputs to a lane-keeping safe set 202 according to some embodiments of the present technology. While certain inputs are described, in some embodiments some of the described inputs may be omitted, and/or additional inputs may be provided.

A vehicle status module 204 may receive sensor data 206 from onboard sensors, and may provide sensed parameters 206 to the lane-keeping safe set 202 based on the sensor data 206. The sensed parameters 206 may include position, velocity, acceleration, latitude and longitude, and similar parameters.

A perception/planning module 210 may receive camera data 212 from onboard cameras, and may provide lane and path data 214 to the lane-keeping safe set 202 based on the camera data 212. The lane and path data 214 may include lane boundary data, reference path data, and similar data.

Map data 216 may be provided to the lane-keeping safe set 202.

A query module 218 may receive time and position data 220, and may provide wind data 222 to the lane-keeping safe set 202 based on the time and position data 220. The wind data 222 may include wind direction, wind speed, confidence metrics for the wind data 222, and similar data. The wind data may be obtained from onboard sensors, from remote sources, or both.

A model transformation module 224 may receive bicycle model parameters 226 as described in more detail herein, and may perform a model transformation to generate a model setup 228 for the vehicle. The transformation module 224 may provide the model setup 228 to the lane-keeping safe set 202.

Figure 3:
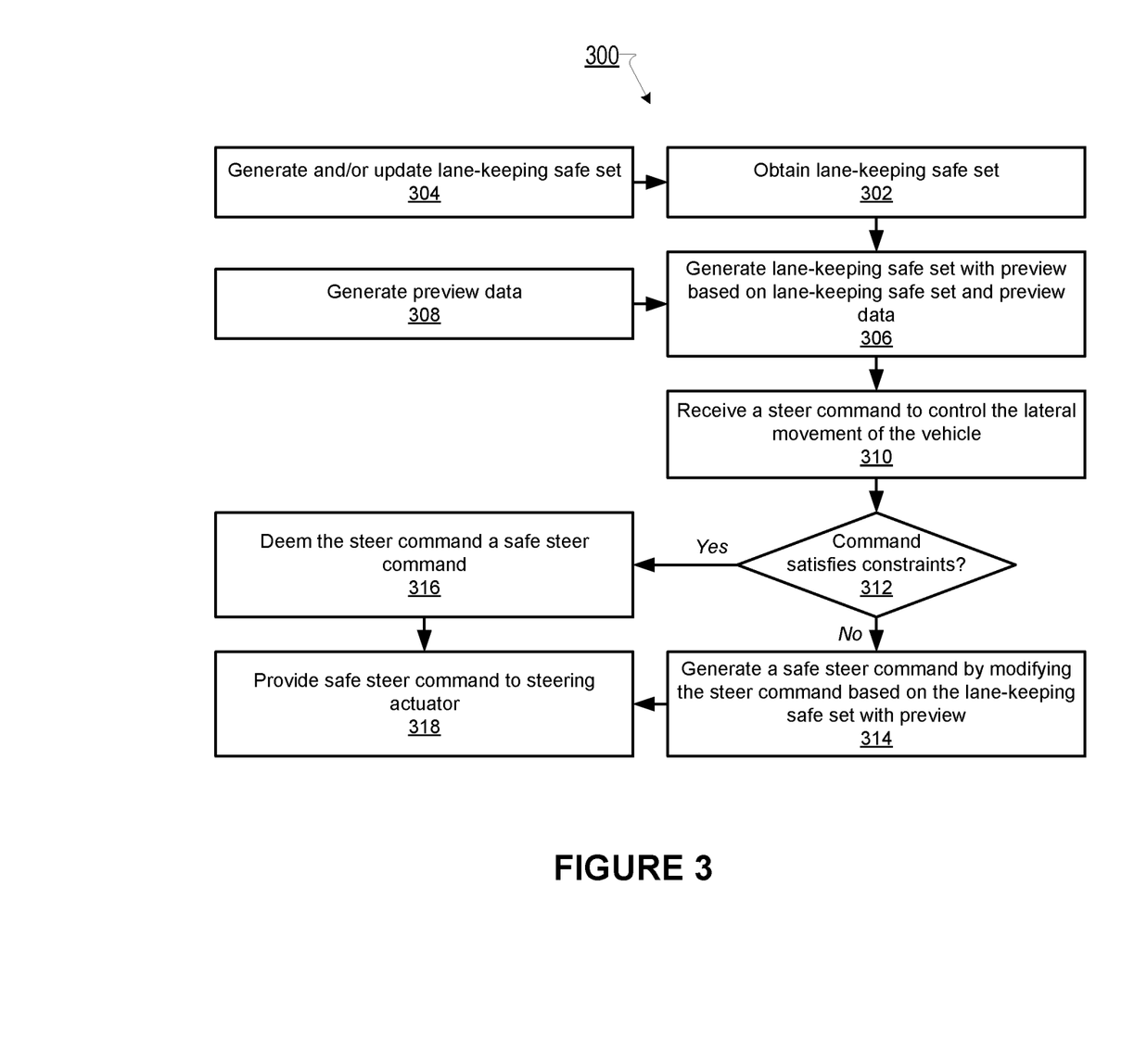
FIG. 3 illustrates an example method, according to embodiments of the present technology.

FIG. 3 illustrates an example method 300, according to embodiments of the present technology. The elements of the method 300 are presented in one arrangement. However, it should be understood that one or more elements of the method may be performed in a different order, in parallel, omitted entirely, and the like. Furthermore, the method 300 may include other elements in addition to those presented. For example, the method 300 may include error-handling functions if exceptions occur, and the like.

At block 302, the method 300 may obtain a lane-keeping safe set. For example, the lane-keeping safe set may be obtained from a library of the lane-keeping safe sets. The lane-keeping safe set may be associated with constraints on lateral movement of a vehicle traveling on a road. At block 304, the method 300 may generate and/or update the lane-keeping safe set prior to obtaining the lane-keeping safe set.

At block 306, the method 300 may generate a lane-keeping safe set with preview based on the lane-keeping safe set and preview data. The preview data may represent known characteristics of the road ahead of the vehicle. At block 308, the method 300 may generate the preview data.

At block 310, the method 300 may receive a steer command to control the lateral movement of the vehicle. For example, the steer command may be received from a primary controller of the vehicle.

At block 312, the method 300 may determine whether the steer command satisfies the constraints of a safety filter. At block 314, the method 300 may generate a safe steer command by modifying the steer command based on the lane-keeping safe set with preview when the steer command does not satisfy the constraints of the safety filter. At block 316, the method 300 may deem the steer command a safe steer command when the steer command satisfies the constraints of the safety filter. In either case, at block 318, the method 300 may provide the safe steer command to a steering actuator of the vehicle.

Now, various mathematical concepts associated with the safety filter will be described in detail according to some embodiments of the present technology. A safe set may be described by equation (1).

$$C = \{x \in \mathbb{R}^n : \geq 0\}. \tag{1}$$

where
C is the safe set,
x is the state,
$\mathbb{R}^n$ is n-dimensional space, and
h(x) is a control barrier function.

The inputs to the safe set may be described by equation (2).

$$\mathcal{U}_{safe} = \{u \in \mathcal{U} : L_f h(x) + L_g h(x) u \geq -\alpha h(x)\} \tag{2}$$

where
$\mathcal{U}_{safe}$ is set of safe inputs that guarantee the forward-invariance of safe set C,
u is the input,
$\mathcal{U}$ is the set of allowable inputs,
$L_f$ is the Lie derivative with respect of f(x),
$L_g$ is the Lie derivative with respect to g(x), and
$\alpha$ is a positive constant.

Now, a control barrier function is described according to some embodiments of the present technology.

Let x be the state, u be the input, such that $u_{min} \leq u_{max}$.
Let $\alpha(\cdot)$ be a class-$\mathcal{K}$ function.
Let the system have the dynamics of equation (3).

$$\dot{x} = f(x) + g(x)u \tag{3}$$

Let h(x) be a differentiable function and C be the safe set of equation (1). Then in equation (4), h(x) is a Control Barrier Function.

$$L_f h(X) + L_g h(x) u \geq -\alpha(h(x)) \tag{4}$$

When u is applied to the system such that equation (4) is satisfied, the system will remain in safe set C.

Now, a lateral dynamic model is described according to some embodiments of the present technology. In this model:
$\mathcal{Y}$ is lateral error
$\mathcal{V}$ is lateral velocity
$\psi$ is heading error
r is heading rate
$\delta_f$ is steering angle The dynamic model is given by equation (5).

$$\begin{bmatrix} \dot{y} \\ \dot{v} \\ \dot{\psi} \\ \dot{r} \end{bmatrix} = \begin{bmatrix} 0 & 1 & 0 & 0 \\ 0 & -\frac{C_f + C_r}{M u_0} & 0 & \frac{l_r C_r - l_f C_f}{M u_0} - u_0 \\ 0 & 0 & 0 & 1 \\ 0 & \frac{l_r C_r - l_f C_f}{I_z u_0} & 0 & \frac{l_f^2 C_f - l_r^2 C_r}{I_z u_0} \end{bmatrix} \begin{bmatrix} y \\ v \\ \psi \\ r \end{bmatrix} +$$

$$\begin{bmatrix} 0 \\ \frac{C_f}{M} \\ 0 \\ l_f \frac{C_f}{I_z} \end{bmatrix} \delta_f + \begin{bmatrix} 0 \\ 0 \\ -1 \\ 0 \end{bmatrix} r_d, \tag{5}$$

where
$C_f$ is the cornering stiffness of the front tires,
$C_r$ is the cornering stiffness of the rear tires,
M is the mass of the vehicle,
$u_0$ is the speed of vehicle,
$l_r$ is the distance of the front wheel axle from the center of gravity,
$l_f$ is the distance of the rear wheel axle from the center of gravity,
$I_z$ is the moment of inertia, and
$r_d$ is the desired rotational speed.

The system may limit lateral error to a maximum value, as in equation (6).

$$|\mathcal{Y}| \leq \mathcal{Y}_{max} \tag{6}$$

Then the control barrier function is given by equation (7).

$$h(x) = (\mathcal{Y}_{max} - \text{sgn}(\dot{\mathcal{Y}})\mathcal{Y}) - \frac{1}{2} \frac{\dot{y}^2}{\alpha_{y, max}}, \tag{7}$$

where $\alpha \mathcal{Y}_{,max}$

Solving for the bicycle model yields the constraints of equation (8).

$$\delta_f \leq \frac{1}{\dot{y} C_f} [F_0 \dot{\mathcal{Y}} - M \alpha_{y,max} |\dot{\mathcal{Y}}| + M \alpha_{y,max} \alpha(h(x))], \tag{8}$$

where $F_0$

Lateral safety may be ensured when the inputs fulfill the constraints of equation (8).

The disclosed safety filters may work on the principle of forward-invariance of safe sets so that when the system is in a safe set it should remain in the safe set. Consider the system of equation (9).

$$\dot{x} = f(x) + g(x)u \tag{9}$$

where
$f(x)$ is a function that describes the dynamics of the system depending upon the state, and
$g(x)$ is a function that describes the dynamics of the system depending upon input.

The system is initially safe for the initial state of equation (10).

$$x \in C \subseteq \mathbb{R}_n \tag{10}$$

Then the system will remain safe when equation (11) is satisfied.

$$L_f h(x) + L_g h(x) u \geq -\alpha(h(x)) \tag{11}$$

A conventional primary controller may be described by equation (12).

$$\delta_{safe} = \operatorname{argmin}|\delta - \delta_{nom}|^2 \tag{12}$$

$$\text{s.t., } \dot{\mathcal{Y}}\delta \leq \frac{1}{C_f}\left[F_0\dot{\mathcal{Y}} - M\alpha_{y,max}|\dot{\mathcal{Y}}| + M\alpha_{y,max}\alpha(h(x))\right],$$

where $\delta_{safe}$ is safe input,
$\delta$ is an optimization parameter, and
$\delta_{nom}$ is a nominal controller which is calculated by conventional methods.

This is not a closed-form solution. It requires solving Quadratic Programming (QP) at every time step. To overcome this problem, embodiments of the present technology may employ the closed-form solution of equations (13) and (14).

$$A_{cbf} = \dot{\mathcal{Y}}c_f rg, \tag{13}$$

$$b_{cbf} = \frac{1}{C_f}\left[F_0\dot{\mathcal{Y}} - M\alpha_{y,max}|\dot{\mathcal{Y}}| + M\alpha_{y,max}\alpha(h(x))\right],$$

$$\delta_{safe} = \delta_{nom} - \max\left(0, \frac{A_{cbf}\delta_{nom} - b_{cbf}}{A_{cbf}}\right), \tag{14}$$

where $A_{cbf}$ is defined above in equation 13,
$b_{cbf}$ is defined above in equation 13, and
$g = 9.8 \text{ m/s}^2$ is the gravitational constant.

Conventional solutions assume actuator delay to be negligible. In practice actuator delay is considerable. Embodiments of the present technology can address such issues with the addition of $\beta$ as preview, for example as shown in equations (15).

$$h(x) = \mathcal{Y}_{max} - \operatorname{sgn}(\dot{\mathcal{Y}})(\mathcal{Y} + \beta\dot{\mathcal{Y}}) - \frac{(1+\beta)^2}{2}\frac{\dot{\mathcal{Y}}^2}{\alpha_{y,max}}, \tag{15}$$

$$h(x, u) = -|\dot{\mathcal{Y}}| - \left(\operatorname{sgn}(\dot{\mathcal{Y}})\beta + \frac{(1+\beta)^2}{\alpha_{y,max}}\dot{\mathcal{Y}}\right)\ddot{\mathcal{Y}}$$

Equations (16)-(21) are a derivation of the safety filter with control barrier function.

$$-|\dot{\mathcal{Y}}| - \frac{1}{M}\left(\operatorname{sgn}(\dot{\mathcal{Y}})\beta + \frac{(1+\beta)^2}{\alpha_{y,max}}\dot{\mathcal{Y}}\right)(C_f\delta - F_0) + \alpha h(x) \geq 0 \tag{16}$$

$$-\frac{1}{M}\left(\operatorname{sgn}(\dot{\mathcal{Y}})\beta + \frac{(1+\beta)^2}{\alpha_{y,max}}\dot{\mathcal{Y}}\right)(C_f\delta - F_0) \geq -\alpha h(x) + |\dot{\mathcal{Y}}| \tag{17}$$

$$\frac{1}{M}\left(\operatorname{sgn}(\dot{\mathcal{Y}})\beta + \frac{(1+\beta)^2}{\alpha_{y,max}}\dot{\mathcal{Y}}\right)(C_f\delta - F_0) \leq \alpha h(x) + |\dot{\mathcal{Y}}| \tag{18}$$

$$\frac{1}{M}\left(\frac{\operatorname{sgn}(\dot{\mathcal{Y}})\beta\alpha_{y,max} + (1+\beta)^2\dot{\mathcal{Y}}}{\alpha_{y,max}}\right)(C_f\delta - F_0) \leq \alpha h(x) - |\dot{\mathcal{Y}}| \tag{19}$$

$$\left(\frac{\operatorname{sgn}(\dot{\mathcal{Y}})\beta\alpha_{y,max} + (1+\beta)^2\dot{\mathcal{Y}}}{\alpha_{y,max}M}\right)(C_f\delta - F_0) \leq \alpha h(x) - |\dot{\mathcal{Y}}| \tag{20}$$

$$\left(\frac{\operatorname{sgn}(\dot{\mathcal{Y}})\beta\alpha_{y,max} + (1+\beta)^2\dot{\mathcal{Y}}}{\alpha_{y,max}M}\right)C_f\delta - \tag{21}$$

$$\left(\frac{\operatorname{sgn}(\dot{\mathcal{Y}})\beta\alpha_{y,max} + (1+\beta)^2\dot{\mathcal{Y}}}{\alpha_{y,max}M}\right)F_0 \leq \alpha h(x) - |\dot{\mathcal{Y}}|$$

The safety filter with preview may be as shown in equations (22) and (23).

$$\left(\underbrace{\frac{\operatorname{sgn}(\dot{\mathcal{Y}})\beta\alpha_{y,max} + (1+\beta)^2\dot{\mathcal{Y}}}{\alpha_{y,max}M}}_{A_{cbf}}\right)C_f\delta_f \leq \tag{22}$$

$$\underbrace{\left(\frac{\operatorname{sgn}(\dot{\mathcal{Y}})\beta\alpha_{y,max} + (1+\beta)^2\dot{\mathcal{Y}}}{\alpha_{y,max}M}\right)F_0 + \alpha h(x) - |\dot{\mathcal{Y}}|}_{b_{cbf}}$$

$$\delta_{safe} = \delta_{nom} - \max\left(0, \frac{A_{cbf}\delta_{nom} - b_{cbf}}{A_{cbf}}\right) \tag{23}$$

Figure 4:
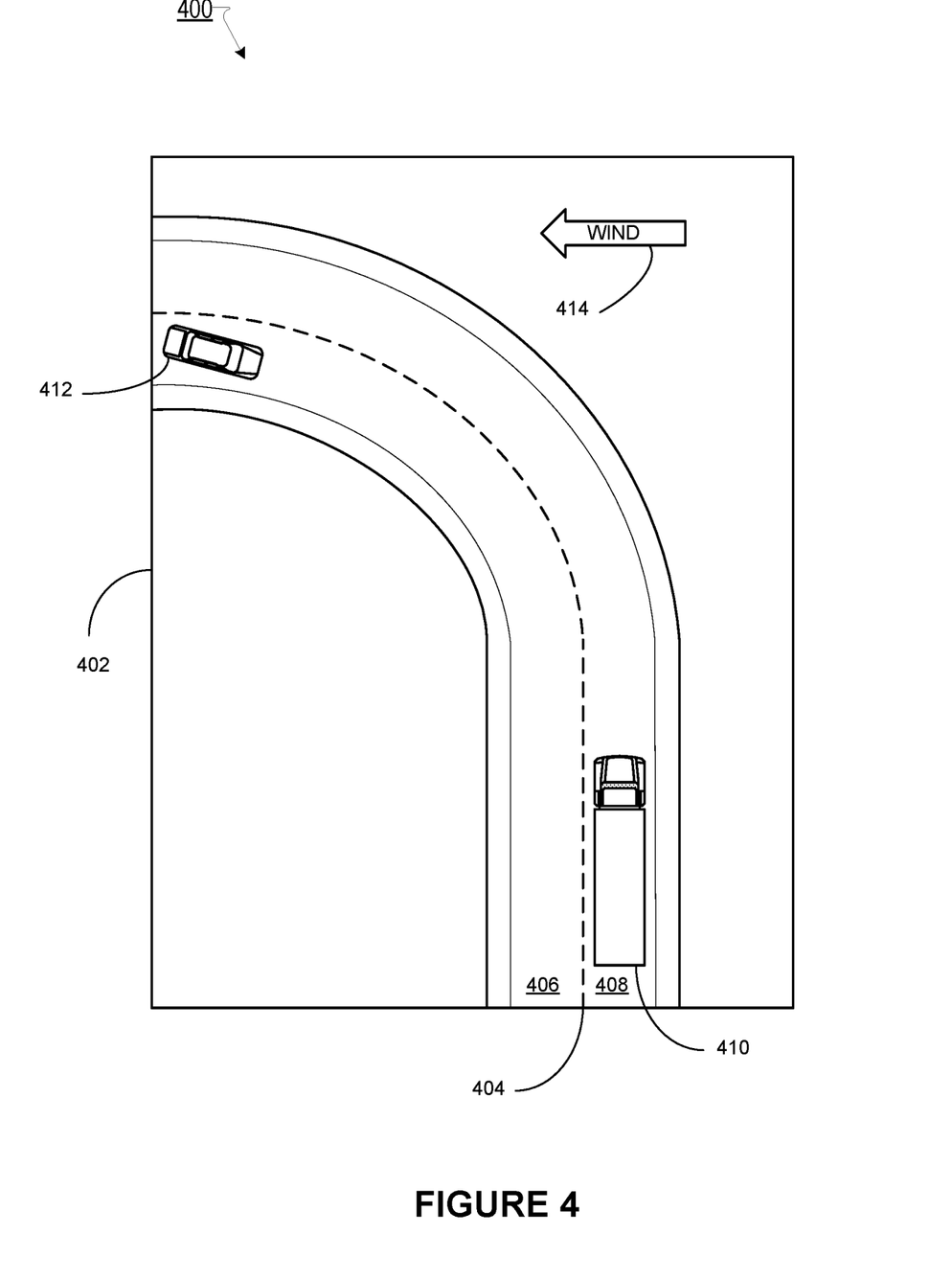
FIG. 4 illustrates an example operation of the safety filter, according to some embodiments of the present technology.

FIG. 4 illustrates an example 400 of operation of the safety filter according to some embodiments of the present technology. It should be understood that there can be additional, fewer, or alternative functionality or steps performed in similar or alternative orders, or in parallel, based on the various features and embodiments discussed herein unless otherwise stated.

As illustrated in FIG. 4, the example 400 includes an image 402 of a highway environment. The image 402 of the highway environment includes a lane boundary 404 that separates two lanes 406 and 408. An autonomous system of navigation utilized by a truck 410 includes a safety filter with preview implemented according to various embodiments of the present technology. The truck 410 is traveling in lane 408, and is approaching a curve where the road bends to the left. A car 412 is traveling in lane 406, and is approaching the curve as well.

A strong wind is blowing from right to left, as indicated by an arrow 414. The direction of the wind is the same as the direction the truck 410 will need to turn to safely negotiate the curve. In this example, the primary controller issues a steer command that does not consider the wind. With this steer command, the truck 410 would be blown across the lane boundary 404 into lane 406, possibly causing a collision with the oncoming car 412.

The safety filter with preview considers the wind, and finds the steer command issued by the primary controller will violate the constraints of the safety filter with preview by violating the lane boundary 404. The safety filter with preview therefore modifies the steer command to generate a safe steer command, and provides the safe steer command to the steering actuator of the truck 410. For example, the safety filter with preview may change the steering angle slightly to the right to counteract the effects of the wind. The safety filter with preview may modify the steer command in other ways, as described herein. As one example, the safety filter with preview may consider a known delay in operating the steering actuator, and may modify the steer command accordingly.

It is contemplated that there can be many other uses, applications, and/or variations associated with the various embodiments of the present technology. For example, various embodiments of the present technology can learn, improve, and/or be refined over time.

Example Implementations

Figure 5:
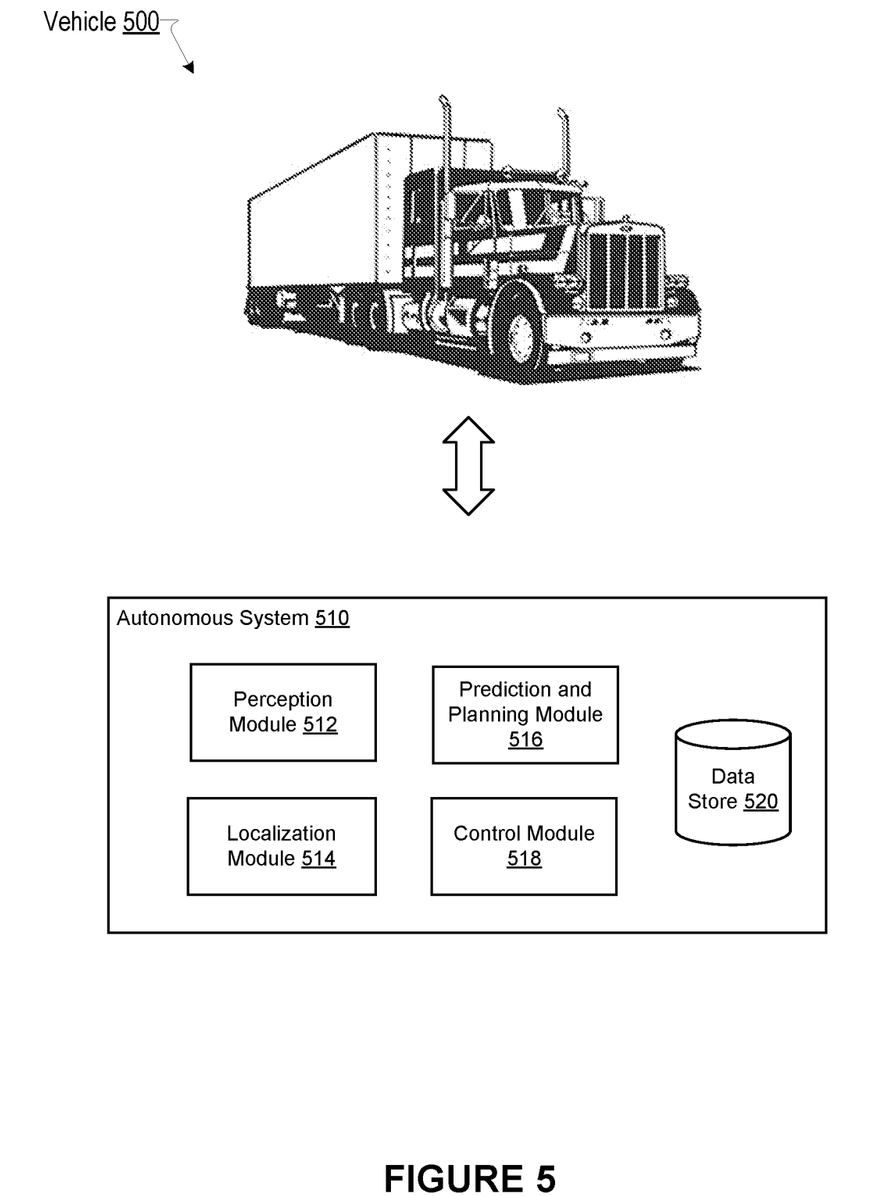
FIG. 5 illustrates a vehicle including an autonomous system, according to various embodiments of the present technology.

FIG. 5 illustrates a vehicle 500 including an autonomous system 510, according to various embodiments of the present technology. The functionality and operation of the present technology, including the autonomous system 510, can be implemented in whole or in part by the vehicle 500. The present technology can cause desired control and navigation of the vehicle 500, as described herein. In some embodiments, the vehicle 500 is a truck, which can include a trailer. The truck can be of any size (e.g., medium truck, heavy truck, very heavy truck, etc.) or weight (e.g., greater than 14,000 pounds, greater than 26,000 pounds, greater than 70,000 pounds, etc.). The autonomous system 510 of the vehicle 500 can support and execute various modes of navigation of the vehicle 500. The autonomous system 510 can support and execute an autonomous driving mode, a semi-autonomous driving mode, and a driver assisted driving mode of the vehicle 500. The autonomous system 510 also can enable a manual driving mode. For operation of the vehicle 500, the autonomous system 510 can execute or enable one or more of the autonomous driving mode, the semi-autonomous driving mode, the driver assisted driving mode, and the manual driving mode, and selectively transition among the driving modes based on a variety of factors, such as operating conditions, vehicle capabilities, and driver preferences.

In some embodiments, the autonomous system 510 can include, for example, a perception module 512, a localization module 514, a prediction and planning module 516, and a control module 518. The functionality of the perception module 512, the localization module 514, the prediction and planning module 516, and the control module 518 of the autonomous system 510 are described in brief for purposes of illustration. The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the autonomous system 510 can be implemented in any suitable combinations.

The perception module 512 can receive and analyze various types of data about an environment in which the vehicle 500 is located. Through analysis of the various types of data, the perception module 512 can perceive the environment of the vehicle 500 and provide the vehicle 500 with critical information so that planning of navigation of the vehicle 500 is safe and effective. For example, the perception module 512 can determine the pose, trajectories, size, shape, and type of obstacles in the environment of the vehicle 500. Various models, such as machine learning models, can be utilized in such determinations.

The various types of data received by the perception module 512 can be any data that is supportive of the functionality and operation of the present technology. For example, the data can be attributes of the vehicle 500, such as location, velocity, acceleration, weight, and height of the vehicle 500. As another example, the data can relate to topographical features in the environment of the vehicle 500, such as traffic lights, road signs, lane markers, landmarks, buildings, structures, trees, curbs, bodies of water, etc. As yet another example, the data can be attributes of dynamic obstacles in the surroundings of the vehicle 500, such as location, velocity, acceleration, size, type, and movement of vehicles, persons, animals, road hazards, etc.

Sensors can be utilized to capture the data. The sensors can include, for example, cameras, radar, LiDAR (light detection and ranging), GPS (global positioning system), IMUs (inertial measurement units), and sonar. The sensors can be appropriately positioned at various locations (e.g., front, back, sides, top, bottom) on or in the vehicle 500 to optimize the collection of data. The data also can be captured by sensors that are not mounted on or in the vehicle 500, such as data captured by another vehicle (e.g., another truck) or by non-vehicular sensors located in the environment of the vehicle 500.

The localization module 514 can determine the pose of the vehicle 500. Pose of the vehicle 500 can be determined in relation to a map of an environment in which the vehicle 500 is traveling. Based on data received by the vehicle 500, the localization module 514 can determine distances and directions of features in the environment of the vehicle 500. The localization module 514 can compare features detected in the data with features in a map (e.g., HD map) to determine the pose of the vehicle 500 in relation to the map. The features in the map can include, for example, traffic lights, crosswalks, road signs, lanes, road connections, stop lines, etc. The localization module 514 can allow the vehicle 500 to determine its location with a high level of precision that supports optimal navigation of the vehicle 500 through the environment.

The prediction and planning module 516 can plan motion of the vehicle 500 from a start location to a destination location. The prediction and planning module 516 can generate a route plan, which reflects high level objectives, such as selection of different roads to travel from the start location to the destination location. The prediction and planning module 516 also can generate a behavioral plan with more local focus. For example, a behavioral plan can relate to various actions, such as changing lanes, merging onto an exit lane, turning left, passing another vehicle, etc. In addition, the prediction and planning module 516 can generate a motion plan for the vehicle 800 that navigates the vehicle 500 in relation to the predicted location and movement of other obstacles so that collisions are avoided. The prediction and planning module 516 can perform its planning operations subject to certain constraints. The constraints can be, for example, to ensure safety, to minimize costs, and to enhance comfort.

Based on output from the prediction and planning module 516, the control module 518 can generate control signals that can be communicated to different parts of the vehicle 500 to implement planned vehicle movement. The control module 518 can provide control signals as commands to actuator subsystems of the vehicle 500 to generate desired movement. The actuator subsystems can perform various functions of the vehicle 500, such as braking, acceleration, steering, signaling, etc.

The autonomous system 510 can include a data store 520. The data store 520 can be configured to store and maintain information that supports and enables operation of the vehicle 500 and functionality of the autonomous system 510. The information can include, for example, instructions to perform the functionality of the autonomous system 510, data captured by sensors, data received from a remote computing system, parameter values reflecting vehicle states, map data, machine learning models, algorithms, vehicle operation rules and constraints, navigation plans, etc.

The autonomous system 510 of the vehicle 500 can communicate over a communications network with other computing systems to support navigation of the vehicle 500. The communications network can be any suitable network through which data can be transferred between computing systems. Communications over the communications network involving the vehicle 500 can be performed in real time (or near real time) to support navigation of the vehicle 500.

The autonomous system 510 can communicate with a remote computing system (e.g., server, server farm, peer computing system) over the communications network. The remote computing system can include an autonomous system, and perform some or all of the functionality of the autonomous system 510. In some embodiments, the functionality of the autonomous system 510 can be distributed between the vehicle 500 and the remote computing system to support navigation of the vehicle 500. For example, some functionality of the autonomous system 510 can be performed by the remote computing system and other functionality of the autonomous system 510 can be performed by the vehicle 500. In some embodiments, a fleet of vehicles including the vehicle 500 can communicate data captured by the fleet to a remote computing system controlled by a provider of fleet management services. The remote computing system in turn can aggregate and process the data captured by the fleet. The processed data can be selectively communicated to the fleet, including vehicle 500, to assist in navigation of the fleet as well as the vehicle 500 in particular. In some embodiments, the autonomous system 510 of the vehicle 500 can directly communicate with a remote computing system of another vehicle. For example, data captured by the other vehicle can be provided to the vehicle 500 to support navigation of the vehicle 500, and vice versa. The vehicle 500 and the other vehicle can be owned by the same entity in some instances. In other instances, the vehicle 500 and the other vehicle can be owned by different entities.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 6:
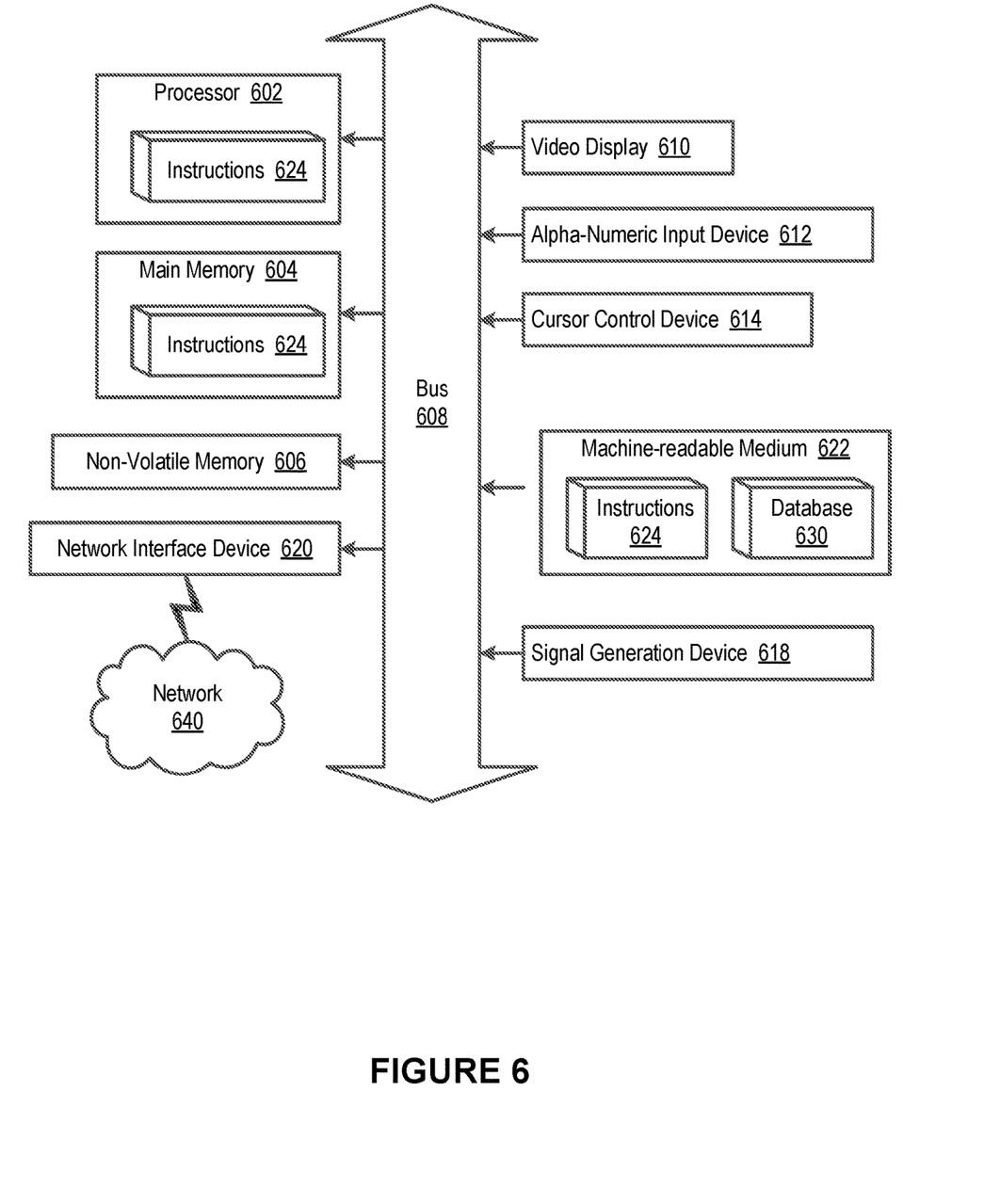
FIG. 6 illustrates an example of a computer system that may be used to implement one or more of the embodiments of the present technology.

FIG. 6 illustrates an example of a computer system 600 that may be used to implement one or more of the embodiments of the present technology. The computer system 600 can be included in a wide variety of local and remote machine and computer system architectures and in a wide variety of network and computing environments that can implement the functionalities of the present technology. The computer system 600 includes sets of instructions 624 for causing the computer system 600 to perform the functionality, features, and operations discussed herein. The computer system 600 may be connected (e.g., networked) to other machines and/or computer systems. In a networked deployment, the computer system 600 may operate in the capacity of a server or a client machine in a client-server network environment, or as a peer machine in a peer-to-peer (or distributed) network environment.

The computer system 600 includes a processor 602 (e.g., a central processing unit (CPU), a graphics processing unit (GPU), or both), a main memory 604, and a nonvolatile memory 606 (e.g., volatile RAM and non-volatile RAM, respectively), which communicate with each other via a bus 608. In some embodiments, the computer system 600 can be a desktop computer, a laptop computer, personal digital assistant (PDA), or mobile phone, for example. In one embodiment, the computer system 600 also includes a video display 610, an alphanumeric input device 612 (e.g., a keyboard), a cursor control device 614 (e.g., a mouse), a signal generation device 618 (e.g., a speaker) and a network interface device 620.

In one embodiment, the video display 610 includes a touch sensitive screen for user input. In one embodiment, the touch sensitive screen is used instead of a keyboard and mouse. A machine-readable medium 622 can store one or more sets of instructions 624 (e.g., software) embodying any one or more of the methodologies, functions, or operations described herein. The instructions 624 can also reside, completely or at least partially, within the main memory 604 and/or within the processor 602 during execution thereof by the computer system 600. The instructions 624 can further be transmitted or received over a network 640 via the network interface device 620. In some embodiments, the machine-readable medium 622 also includes a database 630.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 606 may also be a random access memory. The non-volatile memory 606 can be a local device coupled directly to the rest of the components in the computer system 600. A non-volatile memory that is remote from the system, such as a network storage device coupled to any of the computer systems described herein through a network interface such as a modem or Ethernet interface, can also be used.

While the machine-readable medium 622 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 600 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually affect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
 obtaining, by a computing system, a lane-keeping safe set associated with constraints on lateral movement of a vehicle traveling on a road, wherein the constraints include safety constraints and performance objectives, wherein the performance objectives include a minimum allowed lateral offset from a planned path of the vehicle;
generating, by the computing system, a lane-keeping safe set with preview based on the lane-keeping safe set and preview data, the preview data associated with characteristics of the road ahead of the vehicle;
receiving, by the computing system, a steer command to control the lateral movement of the vehicle; and
generating, by the computing system, a safe steer command by modifying the steer command based on the lane-keeping safe set with preview.

2. The computer-implemented method of claim 1, further comprising:
generating, by the computing system, the preview data based on known characteristics of the road ahead of the vehicle.

3. The computer-implemented method of claim 2, further comprising:
obtaining, by the computing system, the known characteristics of the road ahead of the vehicle from at least one of:
an inertial monitoring unit (IMU) onboard the vehicle;
an electronic map of the road ahead of the vehicle;
a current position of the vehicle; and
a current heading of the vehicle.

4. The computer-implemented method of claim 2, wherein the preview data comprises at least one of:
positions of lane boundaries of the road ahead of the vehicle;
positions of the planned path of the vehicle; and
road bank information of the road ahead of the vehicle.

5. The computer-implemented method of claim 1, wherein obtaining the lane-keeping safe set comprises:
selecting the lane-keeping safe set from a library comprising a plurality of the lane-keeping safe sets based on at least one of:
a current operational design domain (ODD) of the vehicle; and
an identity of the vehicle.

6. The computer-implemented method of claim 1, further comprising:
generating, by the computing system, the lane-keeping safe set.

7. The computer-implemented method of claim 6, wherein the lane-keeping safe set is generated based on at least one of:
a position of the vehicle;
a velocity of the vehicle;
an acceleration of the vehicle;
a lateral wind speed at the vehicle;
a lateral wind direction at the vehicle; and
dynamics of an actuator of the vehicle.

8. The computer-implemented method of claim 1, wherein the safety constraints comprise at least one of:
a maximum allowed lateral offset from the planned path of the vehicle;
a maximum allowed deviation from a heading of the vehicle; and
a maximum allowed lateral acceleration of the vehicle.

9. The computer-implemented method of claim 1, wherein the lane-keeping safe set comprises safety constraints, and wherein the safety constraints are formulated as a control barrier function (CBF).

10. The computer-implemented method of claim 1, wherein the performance objectives comprise at least one of:
a minimum allowed rate of deviation from a path of the vehicle; and
a minimum allowed wobble of the vehicle.

11. A non-transitory computer-readable storage medium including instructions that, when executed by at least one processor of a computing system, cause the computing system to perform operations comprising:
obtaining a lane-keeping safe set associated with constraints on lateral movement of a vehicle traveling on a road, wherein the constraints include safety constraints and performance objectives, wherein the performance objectives include a minimum allowed lateral offset from a planned path of the vehicle;
generating a lane-keeping safe set with preview based on the lane-keeping safe set and preview data, the preview data associated with characteristics of the road ahead of the vehicle;
receiving a steer command to control the lateral movement of the vehicle; and
generating a safe steer command by modifying the steer command based on the lane-keeping safe set with preview.

12. The non-transitory computer-readable storage medium of claim 11, the operations further comprising:
generating the preview data based on known characteristics of the road ahead of the vehicle.

13. The non-transitory computer-readable storage medium of claim 12, the operations further comprising:
obtaining the known characteristics of the road ahead of the vehicle from at least one of:
an inertial monitoring unit (IMU) onboard the vehicle;
an electronic map of the road ahead of the vehicle;
a current position of the vehicle; and
a current heading of the vehicle.

14. The non-transitory computer-readable storage medium of claim 12, wherein the preview data comprises at least one of:
positions of lane boundaries of the road ahead of the vehicle;
positions of the planned path of the vehicle; and
road bank information of the road ahead of the vehicle.

15. The non-transitory computer-readable storage medium of claim 11, wherein obtaining the lane-keeping safe set comprises:
selecting the lane-keeping safe set from a library comprising a plurality of the lane-keeping safe sets based on at least one of:
a current operational design domain (ODD) of the vehicle; and
an identity of the vehicle.

16. A system comprising:
at least one processor; and
a memory storing instructions that, when executed by the at least one processor, cause the system to perform operations comprising:
obtaining a lane-keeping safe set associated with constraints on lateral movement of a vehicle traveling on a road, wherein the constraints include safety constraints and performance objectives, wherein the performance objectives include a minimum allowed lateral offset from a planned path of the vehicle;
generating a lane-keeping safe set with preview based on the lane-keeping safe set and preview data, the preview data associated with characteristics of the road ahead of the vehicle;
receiving a steer command to control the lateral movement of the vehicle; and generating a safe steer command by modifying the steer command based on the lane-keeping safe set with preview.

17. The system of claim 16, the operations further comprising:

generating the preview data based on known characteristics of the road ahead of the vehicle.

18. The system of claim 17, the operations further comprising:

obtaining the known characteristics of the road ahead of the vehicle from at least one of:

an inertial monitoring unit (IMU) onboard the vehicle;

an electronic map of the road ahead of the vehicle;

a current position of the vehicle; and a current heading of the vehicle.

19. The system of claim 17, wherein the preview data comprises at least one of:

positions of lane boundaries of the road ahead of the vehicle;

positions of the planned path of the vehicle; and road bank information of the road ahead of the vehicle.

20. The system of claim 16, wherein obtaining the lane-keeping safe set comprises:

selecting the lane-keeping safe set from a library comprising a plurality of the lane-keeping safe sets based on at least one of:

a current operational design domain (ODD) of the vehicle; and an identity of the vehicle.

* * * * *